April 8, 1969  S. J. SARNOFF  3,436,803
UNITING PARTS BY THE USE OF VIBRATIONAL AND POSITIVE
MATERIAL DEFORMING FORCES AND ARTICLE MADE THEREBY
Filed Feb. 7, 1966

INVENTOR
Stanley J. Sarnoff

BY Bowyer and
Witherspoon
ATTORNEYS

United States Patent Office 3,436,803
Patented Apr. 8, 1969

3,436,803
UNITING PARTS BY THE USE OF VIBRATIONAL AND POSITIVE MATERIAL DEFORMING FORCES AND ARTICLE MADE THEREBY
Stanley J. Sarnoff, 7507 Hamden Lane, Bethesda, Md. 20014
Filed Feb. 7, 1966, Ser. No. 525,688
Int. Cl. B23p 11/00; B21d 39/00
U.S. Cl. 29—432.2                    8 Claims

ABSTRACT OF THE DISCLOSURE

A rigid hypodermic needle is joined to a hub of thermoplastic material as of nylon by the use of a tool vibrating at a frequency of about 20K Hertz. The needle, which has a rear flared end is passed through the hub until the rear flared end is seated in a recessed portion within the hub. Thereafter, the tool is applied to the material of the hub about the recess and vibrated to cause displacement of the material of the hub around the flared end of the needle to lock the needle in place in the hub.

---

This invention relates to the molding of plastic materials and to the fixedly connecting together of an initially assembled substantially non-malleable rigid body with a relatively malleable or deformable body, such as a thermoplastic or soft metallic material, by causing a tool with shaped head, while vibrated, to engage the thermoplastic material or equivalent to positively displace that material and form the same about a portion of the rigid body.

It is an object of this invention to provide a new method for molding articles.

It is a further object of this invention to provide a new method of joining thermoplastic or equivalent parts to rigid parts, whether of metal or of another plastic material, so as to form a tight seal between the two.

As an example of the application of the invention, reference is made to the uniting of a hypodermic needle with its collet or hub. In the manufacture of such hypodermic devices, prior to this invention, one customary method of uniting these parts was to swage the hub about the needle, resulting in a frictional engagement, solely, between the needle and the hub. As a result, during an administration of a medicament to a patient, the needle could slip with respect to the hub, resulting in imperfect administration of the medicament or possibly even in leaving the needle in the body of the patient. Also, the swaging method could result in a non-pressure tight seal between the needle and hub thereby causing leakage of fluid along the exterior of the needle, during use of the device. Another common method of joining a needle and hub is by the use of an epoxy resin. However, the resin often spreads into areas where contact with the medicament in a syringe takes place, resulting in contamination of the medicament.

It is, therefore, another object of this invention to provide a method which avoids these deleterious effects.

Another object of this invention is to ensure the nonpulling out of a hypodermic needle from its hub during medicament administration by providing the needle with a flare adjacent the end thereof which is within the hub.

Other objects will become apparent after further consideration of the following specification when taken in conjunction with the accompanying drawings in which.

Figure 1:
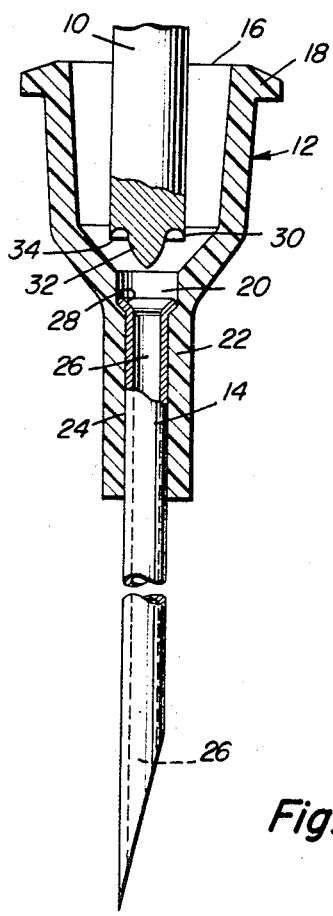
FIG. 1 is a diagrammatic representation, in section, of an initial step in a method, in accordance with this invention, for joining a hypodermic needle with a hub.
Figure 2:
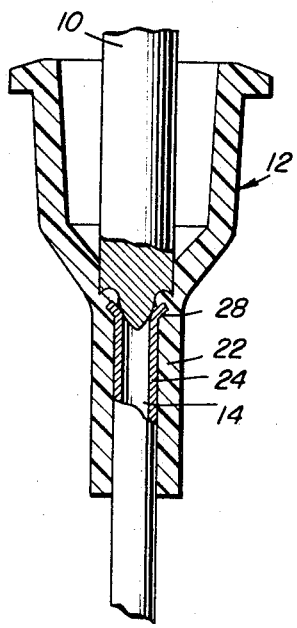
FIG. 2 is a view showing the joining of the needle and its hub in the final state.

Now, referring to the drawings in greater particularity, at 10 in FIGS. 1 and 2 is indicated a member hereinafter termed a horn and which is subject to vibration at a high frequency. While the frequency of vibration imparted to the horn may be of any desired value, it is found that best results are obtained for uniting the parts hereinafter designated when a frequency of about 20 kilocycles per second is employed, plus or minus one percent. For an explanation of how the horn may be vibrated, attention is directed to the disclosure in the patent to Balamuth et al. 3,184,353.

The horn 10 serves in its action to effect the uniting and shaping of thermoplastic materials or equivalents about substantially non-malleable rigid parts, particularly where the rigid parts are provided with an irregular surface as indentations, apertures or protuberances. In its application to the joining of a hypodermic needle of the type illustrated to its hub, the horn serves to effect the uniting of a generally cylindrically-shaped hub 12, desirably of nylon, and which is shown in section in FIGS. 1 to 3, to a hypodermic needle 14, as of stainless steel or other suitable material. The combination of said hub and needle could be utilized in conjunction with a conventional syringe for the purpose of making an injection. Additionally, the hub portion of the combination may be provided a substantially planar surface 16 and a flanged portion 18. Also, desirably, the hub should be transparent so that the flow of fluid through the apparatus may be observed. The assembly of needle and hub may be secured to the neck of a vial with the aid of an intermediate rubber gasket and metal collar as disclosed by applicant in application 447,741, filed Apr. 13, 1965, now abandoned. The bottom of the hub is provided with a circular cylindrical recess 20 and a neck portion 22 having a cylindrical bore 24 therethrough communicating with the recess.

Snugly fitted within the bore is the hypodermic needle 14 provided with the throughbore 26 and terminating near one end and preferably at its upper end in a flared circular head 28. To form an initial assembly of needle and hub, the needle is inserted into hub 12 until the head of the needle contacts the bottom wall of the recess 20, the needle then being positioned in the hub. The diameter of the head of the needle is just slightly less than the diameter of the recess 20, to permit full seating of the needle head against the bottom of the recess.

With parts thus assembled, the hub is mounted in a suitable holder in a sonic-vibrating machine, the needle axis being placed in alinement with the axis of the horn 10 of the machine.

The horn, in the main, is a cylindrical body which hsa a diameter slightly in excess of the diameter of the recess 20. The lower end of the horn is provided with a circular knife edge 30 which engages the interior wall of the circular portion of the hub, the horn being also provided with a centering tooth 32, there being a circular groove 34 surrounding the tooth and connecting the tooth and knife edge.

During operation, when the horn is subjected to sonic vibrations and forced downwardly, the lengths of the knife edge and tooth are such that the knife edge first engages the plastic inner wall of the bowl portion of the hub, immediately above the recess 20, and by shearing action and horn vibration displaces part of the plastic material, forcing it down toward the recess. As the horn continues to move, the tooth engages the head of the needle forcing it a slight distance into the thermoplastic which yields due to the vibrational and mechanical forces applied ot it. At the same time some of the displaced material of the hub, in its malleable condition due to the vibrating motion of the horn, is curled over the peripheral portion of the head of the needle, thereby firmly fixing the needle in place. The final position of the horn is shown in FIG. 2.

Figure 3:
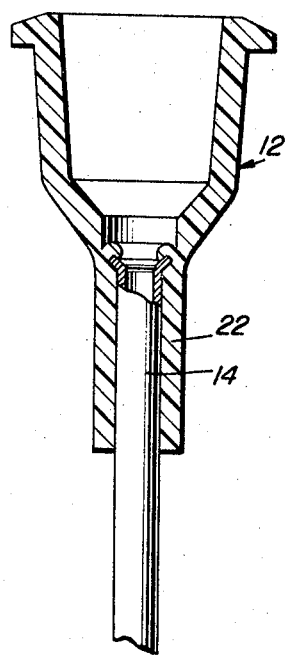
FIG. 3 is a view of the united needle and hub.

The completed hub and needle assembly is shown in FIG. 3.

Figure 4:
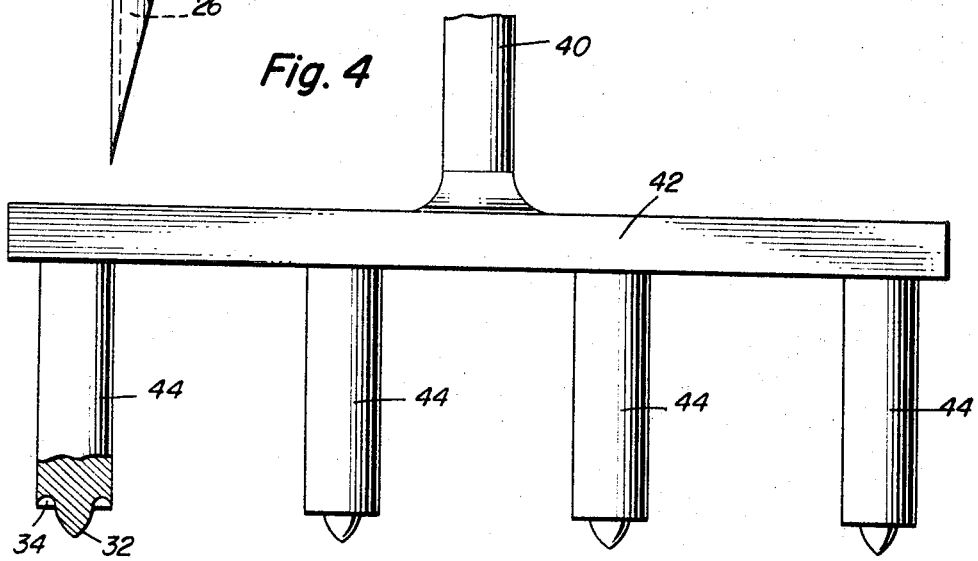
FIG. 4 is a diagrammatic representation of a plural horn structure for simultaneously effecting a joining of a multiplicity of needles and hubs.

When it is desired to simultaneously affix more than one assembly of hub and needle, the horn 10, as shown in FIG. 4, may be replaced by a multiple horn structure comprised of a support shaft 40 with branch arm 42, each of which may support a number of horns as 44, whose lower ends are configurated in accordance with the teaching of this invention and as explained in detail above.

When purely molding of readily malleable articles is desired, the end of the horn may be configurated to the ultimate shape desired and applied while vibrated at preferably about 20 kilocycles per second to the unshaped material to effect conformation. If desired, inner and outer vibratory horns may be applied to the material to form hollow articles or the horn may be provided with reflexed surfaces to simultaneously form both inner and outer contour faces on the material.

Having thus described the invention, what is claimed is:

1. A method of fixedly connecting a substantially non-malleable body to a relatively malleable body which compirses initially assembling the two bodies in engagement with one another with a portion of the non-malleable body within an irregularity in the surface of the relatively malleable body, applying a sonic vibratory and a displacing force to the relatively malleable body adjacent said irregularity and displacing a portion of the relatively malleable body adjacent said irregularity and forcing it into contact with an exposed surface of the non-malleable body, whereby the non-malleable body is held immobilized by the displaced material of the relatively malleable body.

2. A method as set forth in claim 1 in which the relatively malleable material is a thermoplastic material.

3. A method as set forth in claim 1 in which the relatively malleable material is metallic.

4. A method as set forth in claim 1 in which additionally a surface portion of the non-malleable body opposite to a surface of the malleable body is forced into engagement with said opposite surface.

5. The method as set forth in claim 1 wherein the relatively malleable body is a thermoplastic body in the form of a hub provided with a neck portion having a bore therethrough and with a recess in the bottom of the hub communicating with said bore and wherein the substantially non-malleable body is a rigid hypodermic needle with the shank of the needle passing through the bore and a head portion of the needle positioned within said recess.

6. The method as set forth in claim 5 wherein the head of the needle is driven into the material of the bottom of the recess.

7. The method as set forth in claim 5 wherein the thermoplastic material is shaped into the form of a ring integral with the hub and overlying the periphery of the head portion of the needle.

8. The method as set forth in claim 7 wherein the head of the needle is driven into the material of the bottom of the recess.

References Cited

UNITED STATES PATENTS

| | | |
|---|---|---|
| 1,529,517 | 3/1925 | Tilton. |
| 2,959,170 | 11/1960 | Laub. |
| 3,091,838 | 6/1963 | Hild et al. |
| 3,102,439 | 9/1963 | Martin et al. _____ 29—509 |
| 3,184,353 | 5/1965 | Balamuth et al. |
| 3,276,112 | 10/1966 | Tantlinger et al. ____ 29—509 X |

ANDREW R. JUHASZ, *Primary Examiner.*

G. WEIDENFELD, *Assistant Examiner.*

U.S. Cl. X.R.

29—487, 511, 520; 264—23, 249